(12) United States Patent
Hoffmann et al.

(10) Patent No.: US 8,877,327 B2
(45) Date of Patent: Nov. 4, 2014

(54) SILICONE COATING AS A SEALING LAYER FOR A DECORATION LAYER

(75) Inventors: Ulf Hoffmann, Pfungstadt (DE); Ella Ruhl, Bad Kreuznach (DE); Angelina Milanovska, Mainz (DE); Matthias Bockmeyer, Mainz (DE)

(73) Assignee: Schott AG, Mainz (DE)

( * ) Notice: Subject to any disclaimer, the term of this patent is extended or adjusted under 35 U.S.C. 154(b) by 0 days.

(21) Appl. No.: 13/811,176

(22) PCT Filed: Jul. 20, 2011

(86) PCT No.: PCT/EP2011/003635
§ 371 (c)(1),
(2), (4) Date: Mar. 8, 2013

(87) PCT Pub. No.: WO2012/010302
PCT Pub. Date: Jan. 26, 2012

(65) Prior Publication Data
US 2013/0266781 A1 Oct. 10, 2013

(30) Foreign Application Priority Data
Jul. 21, 2010 (DE) .......................... 10 2010 031 866

(51) Int. Cl.
| | | |
|---|---|---|
| B32B 3/00 | (2006.01) | |
| C03C 17/42 | (2006.01) | |
| F24C 15/10 | (2006.01) | |
| C03C 17/00 | (2006.01) | |
| B32B 17/06 | (2006.01) | |
| B32B 9/00 | (2006.01) | |

(52) U.S. Cl.
CPC ................ *C03C 17/42* (2013.01); *B32B 17/06* (2013.01); *B32B 9/00* (2013.01); *C03C 2217/445* (2013.01); *C03C 2217/45* (2013.01); *C03C 2217/485* (2013.01); *C03C 2217/78* (2013.01); *F24C 15/10* (2013.01); *C03C 17/001* (2013.01)
USPC .......... 428/195.1; 428/204; 428/426; 428/447

(58) Field of Classification Search
CPC .......... B32B 9/00; B32B 17/06; B32B 17/068
USPC ............................... 428/195.1, 204, 426, 447
See application file for complete search history.

(56) References Cited

U.S. PATENT DOCUMENTS

2009/0233082 A1* 9/2009 Esemann et al. ........... 428/319.1

FOREIGN PATENT DOCUMENTS

| | | |
|---|---|---|
| DE | 102009004783 | 7/2010 |
| DE | 102009004784 | 7/2010 |
| FR | 2868066 | 9/2005 |

OTHER PUBLICATIONS

English Translation of International Preliminary Report on Patentability dated Feb. 14, 2013 corresponding to International Patent Application No. PCT/EP2011/003635, 10 pages.
International Search Report Dated Oct. 7, 2011 From International Application No. PCT/EP2011/003635.

(Continued)

*Primary Examiner* — Elizabeth Mulvaney
(74) *Attorney, Agent, or Firm* — Ohlandt, Greeley, Ruggiero & Perle, LLP

(57) ABSTRACT

A glass or glass ceramic article is provided that has a glass or glass ceramic substrate with a decorative coating. The decorative coating includes a decoration layer and a sealing layer. The decoration layer is applied to at least some surface portions of the glass or glass ceramic substrate, and the sealing layer is applied to at least portions of the decoration layer. The decoration layer is a cured sol-gel coating having inorganic solid particles, and the sealing layer is a cured silicone coating comprising inorganic solid particles. Methods for producing such glass or glass ceramic articles are also provided.

24 Claims, 2 Drawing Sheets

(56) References Cited

OTHER PUBLICATIONS

Figure 1:
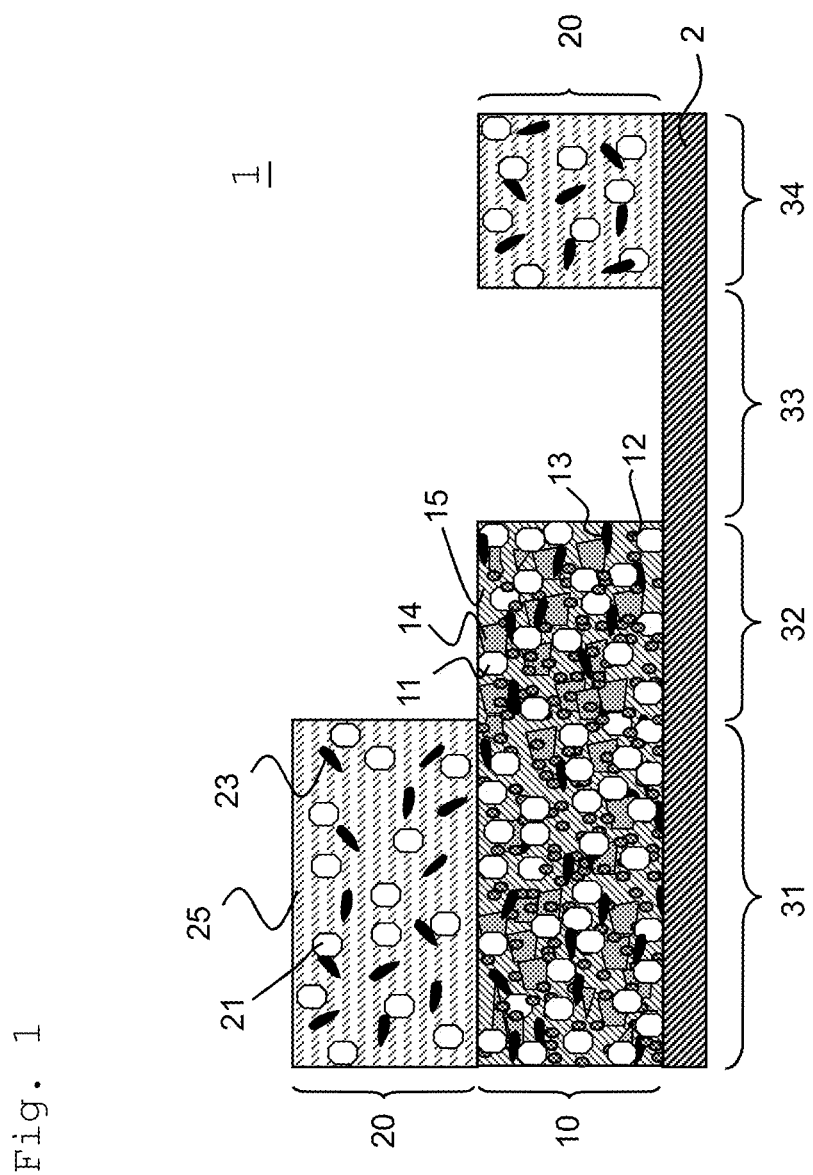

English Translation of International Search Report dated Apr. 17, 2013 corresponding to International Patent Application No. PCT/EP2011/003635, 5 pages.

English Translation of Written Opinion dated Jul. 6, 2012 corresponding to International Patent Application No. PCT/EP2011/003635, 5 pages.

* cited by examiner

SILICONE COATING AS A SEALING LAYER FOR A DECORATION LAYER

The invention relates to a glass or ceramic article having a decorative coating.

BACKGROUND OF THE INVENTION

The use of pigmented layers as a coloring coating for transparent glass or glass ceramic substrates, which are applied as a bottom surface coating for cooktops, for example, is known from prior art. Frequently, pigmented sol-gel coatings are used for this purpose.

Depending on the use of the coated substrates, the coloring layers have to meet specific requirements. If used as a bottom surface coating of cooktops, for example, they not only have to comply with adhesive strength, scratch resistance, thermal stability, and other functional criteria but also have to exhibit a minimum imperviousness to a variety of media, which may come into contact with the coated cooktop from below. Though coloring sol-gel based decoration layers indeed exhibit a certain imperviousness, this is however not nearly sufficient to meet the requirements of cooker manufacturers.

One way to obtain a coloring coating that meets the above criteria and also achieves sufficient imperviousness is described in detail in patent application DE102009004783A1. Here, the decoration layer is covered by a sealing layer which comprises another sol-gel layer. Both sol-gel layers together form a decorative coating. The composition of the sealing layer may be similar to the composition range of the coloring layer, or may differ therefrom.

In many cases, this layer system comprising two sol-gel layers of defined compositions meets the requirements. However, in order to satisfy the requirements on thermal stability, adhesive strength and imperviousness, only specific pigments must be used in defined proportions.

Momentary overheating of the cooktop may cause discoloration of the decorative coating. Solvents from adhesives or silicone oil containing contact media may lead to insufficient imperviousness, so that e.g. the adhesive beads which serve to fix the cooking hobs to the cooktops become visible. An adequate sealing effect can only be achieved with very specific matrix-pigment ratios and by adding a solid lubricant.

Moreover, various colorimetric loci, such as those of "black", but also very light-colored colorimetric loci, cannot be reproduced by the pigmentations of the decorative coating described. Other colorimetric loci may be provided but with poor color stability and poor sealing functionality.

DESCRIPTION OF THE INVENTION

An object of the invention therefore is to provide glass or glass ceramic articles having a decorative coating, which decorative coating is suitable for use as a cooktop bottom surface coating and exhibits high imperviousness to adhesives.

Another object of the invention is to provide glass or glass ceramic articles having a decorative coating, which decorative coating is suitable for use as a cooktop bottom surface coating while allowing for an adequately durable bonding of the article with a cooking hob, the bonding withstanding at least the weight of the cooking hob.

Another object of the invention is to provide glass or glass ceramic articles which are suitable for use as cooktop bottom surface coatings, and which permit to produce light-colored colorimetric loci and the colorimetric locus "black".

Another object of the invention is to provide a method for producing such coatings.

Accordingly, a glass or glass ceramic article having a decorative coating according to the invention comprises:
  a decoration layer applied to at least some surface portions of the glass or glass ceramic substrate, and
a sealing layer applied to at least portions of the decoration layer and/or of the glass or glass ceramic substrate, wherein
  the decoration layer comprises a cured sol-gel coating including inorganic solid particles, and the sealing layer comprises a cured silicone-based coating including inorganic solid particles, and wherein
  the inorganic solid particles comprise pigment particles and/or fillers and/or solid lubricant.

A method for producing a glass or glass ceramic article having a decorative coating including a decoration layer and a sealing layer according to the invention accordingly comprises at least the following steps:
  First a sol-gel based decoration layer is applied to a glass or glass ceramic substrate, by adding inorganic solid particles to a sol, applying the mixture of the sol and the inorganic solid particles to at least some surface portions of the glass or glass ceramic substrate, and curing to form a decoration layer. Then, the sealing layer is applied to at least portions of the decoration layer and/or of the glass or glass ceramic substrate, by adding solid particles to a silicone-based coating solution, applying the resulting mixture to the glass or glass ceramic substrate coated with the decoration layer, and curing. According to a preferred embodiment, the inorganic solid particles that are added to the coating solutions comprise pigment particles and/or fillers and/or solid lubricant.

Surprisingly, the inventors have found that a silicone-based sealing layer, also referred to as a silicone coating in this document, which contains inorganic solid particles, not only satisfies the requirements of a cooktop bottom surface coating in terms of temperature resistance, adherence, scratch resistance and imperviousness, but also allows for the necessary bondability with a cooking hob. In other words, this means that the cooking hob can be adhered to the bottom surface of the cooktop which is provided with the silicone coating, and the strength of the bond is such that it at least supports the weight of the cooking hob without coming off.

However, exactly this is what is not trivial in conjunction with silicone coatings, since adhesives—even silicone adhesives—generally do not or at least not sufficiently adhere to silicone, given the weight of a cooking hob. At the same time it has to be ensured, however, that such a bond is not visible when looking at the cooktop from above. To ensure this, the cooktop bottom surface coating should be impervious to contact media in general, and should in particular be impervious to the adhesive materials used. It is just this combination of particular imperviousness of the silicone coating to adhesives and yet sufficient bondability that makes this particular coating so interesting for use on cooktop bottom surfaces.

Moreover, such a silicon coating, advantageously, is also impervious to other contact media such as conductive pastes, sealing tapes, food debris which may occur when cooking, or even to aggressive substances that may arise, for example, when heating with gas burners.

According to the invention, a layer with good adhesion in general, or a decorative coating with good adhesion in particular means that there will be no detachment of the layer in a tape test according to DIN 58196-6. To this end, differently preconditioned test samples are used (e.g. after baking, after exposure to water vapor, quenching, etc.). Alternatively, a crockmeter test in accordance with DIN 58196-5 may be performed wherein, again, there should not be any detachment of the layer.

Generally, a cured decorative coating having a composition within the range of the invention may have an abrasion resistance of at least category 2 according to DIN 58196-6. However, a slight polishing effect by local smoothing of the layer should be allowed.

Scratch resistance is determined in a scratch test using a 0.75 mm diameter tungsten carbide tip and different weights. A good scratch resistance in the context of the invention means that there is no disturbing visual damage of the layer system to be seen under a weight of 500 g, preferably 800 g. The sample is evaluated looking through the substrate.

A good imperviousness is defined by the tests below, depending on the acting substances, and refers to a layer package comprising a decoration layer and a sealing layer.

Imperviousness of the coating to aqueous and oily media and to cleaning agents is determined in a drop test. A drop of the liquid to be tested is applied to the bottom surface coating, and is allowed to act for different times depending on the medium. Water drops are wiped off after 30 seconds, oil drops after 24 hours, cleaning agents drops after treatment. Then the glass or glass ceramic article is examined from above through the substrate. The drop or a shadow of the drop must not be visible. Penetration of the layer by the applied medium is prohibited. Additionally, the water drop test is performed on differently preconditioned samples: in an as-delivered state, after annealing, after quenching, after water vapor exposure, etc.

In another test for imperviousness to oily media, a cutting edge of the coating is placed in oil, with an exposure time varying from one to five minutes. The oil must not creep upwards into the layer.

The impermeability to an adhesive is determined by applying a bead of adhesive to the coating and curing it in place. Optionally, the samples thus prepared are annealed in different ways. Then the glass or glass ceramic article is examined from above through the substrate. The adhesive bead or a shadow thereof must not be visible.

A test of imperviousness to sealing materials is performed similarly, but without the curing step. The sealing materials or a shadow resulting from outgassing of the sealing materials must not be visible.

Generally, a decorative coating according to the invention, i.e. a layer composite comprising the decoration layer and the sealing layer, passes at least one of the aforementioned imperviousness tests.

According to a particularly preferred embodiment of the invention, the decoration layer comprises, as a cured sol-gel binder, a metal oxide or semi-metal oxide network, preferably a $SiO_2$ network. The network comprises inorganic particles in a ratio of weight percentages of pigment particles and/or filler to solid lubricant ranging from 10:1 to 1:1, preferably from 3:1 to 1:1, and more preferably from 3:1 to 1.5:1.

This ratio of pigments and fillers to solid lubricants provides for sol-gel coatings which are relatively impervious and scratch resistant. In particular, however, such decoration layers exhibit good adhesion to the substrate.

According to another preferred embodiment, the decoration layer comprises, as a solid lubricant, graphite and/or alpha-boron nitride and/or molybdenum sulfide and/or a material whose surface energy exceeds the surface energy of graphite by not more than 20%.

If graphite is used as a solid lubricant, it preferably has particle sizes from 6 to 30 µm; if alpha-boron nitride is used as a solid lubricant, it preferably has an average particle size from 1 to 100 µm, more preferably from 3 and 20 µm.

Pigment particles that are particularly suitable for the decoration layer comprise the following materials: (Cr, Fe)(Ni, Mn) spinels, and/or (Fe, Mn)$_2$O$_3$, and/or (Fe, Mn)(Fe, Mn)O$_4$, and/or CuCr$_2$O$_4$, and/or (Ni, Fe)(Cr, Fe)$_2$O$_4$. Preferably, these pigment particles have grain or agglomerate sizes smaller than 3 µm, preferably smaller than 2 µm, and more preferably smaller than 1 µm.

In order to realize specific colorimetric loci, it is also possible to use CoAl-, CoCrAl-, CoCrMgTiZnAl-, CoNiZnTi-, NiSbTi-, CrSbTi-, FeAlTi-based pigments.

For example, a sol-gel-based decoration layer may be prepared as follows. First a sol known in the art is produced and is mixed with inorganic solid particles. The resulting sol-gel mixture is then applied to a glass or glass ceramic substrate. The coating thus produced can then be dried, preferably at 100 to 250° C. As a result of the drying process, an amorphous xerogel network is formed, with a preferably $SiO_2$-based metal oxide network. Subsequently, the coated substrate may be baked or cured, preferably at temperatures above 350° C. During the baking process, organic residual components such as alcohol or aliphatic groups are released from the amorphous sol-gel binder to form the solid metal oxide framework, in particular a $SiO_2$ or organically modified $SiO_2$ skeleton. In a particularly preferred embodiment, the two process steps of drying and baking are combined in a single process, for example using a roller kiln.

The sealing layer comprises a silicone-based layer. In the context of this document, a silicone-based layer is to be understood as a layer that includes silicon-oxygen bonds, so-called siloxane or polysiloxane bonds, on the one hand, and on the other silicon-carbon bonds which link organic groups to the inorganic framework.

According to one particularly preferred embodiment of the invention, the sealing layer comprises a polysiloxane coating. More preferably, this is a methyl-based polysiloxane coating, and most preferably a polydimethylsiloxane coating. An advantage of such coatings is that commercially available materials may be used, which preferably are even available as single-component systems. Advantageously, this permits a very simple and fast production of such coatings.

According to another embodiment of the invention, the sealing layer may also be a polysilsesquioxane comprising layer, wherein the organic radicals preferably are ethoxy and/or hydroxy groups. Of course, mixed layers of polysiloxanes and polysilsesquioxanes are likewise conceivable as sealing layer materials.

Preferably, the sealing layer thus produced is cured by drying at temperatures above 200° C. If drying is performed at temperatures below 200° C., there is a risk that the achieved adhesion strengths are insufficient for use as a cooktop bottom surface coating. This does not preclude, however, that for other applications, where the adhesive strength of the coating is not so much important, drying at temperatures below 200° C. may be sufficient. Preferably, the sealing layer is cured or dried at temperatures between 250 and 330° C. More preferably, the curing temperature is at least 270° C.

According to one embodiment, the sealing layer comprises, as pigment particles, black pigments, in particular spinels and/or effect pigments, especially platelet-shaped pigments which achieve an enhanced protective barrier effect of the sealing layer. Preferably, the internal porosity of the pigmented sealing layer is <30 m$^2$/g, more preferably <20 m$^2$/g, most preferably <10 m$^2$/g.

The black pigments may preferably comprise (Cr, Fe)(Ni, Mn) spinels, and/or Cu(Cr, Fe, Mn)$_2$O$_4$ spinels, and/or Co(Cr, Fe)$_2$O$_4$ and/or (Ni, Fe)(Cr, Fe)O$_4$ spinels, and/or (Fe, Mn)$_2$O$_3$ and/or (Fe, Mn)(Fe, Mn)$_2$O$_4$ spinels. By using these pigments, dark and black sealing layers may be produced. Preferred average particle sizes range from D50=0.1 to 5 μm, more preferably from D50=0.1 to 1 μm.

The effect pigments may advantageously include mica, glass flakes, coated mica or coated glass flakes, for example effect pigments coated with SiO$_2$/TiO$_2$ or SiO$_2$/TiO$_2$/SnO$_2$ or SiO$_2$/TiO$_2$/Fe$_2$O$_3$. Preferably, the effect pigments used have a diameter of less than 200 μm, more preferably less than 100 μm, most preferably less than 60 μm. In addition to creating specific effects, such as varying colors, the effect pigments especially permit to produce sealing layers with light-colored colorimetric loci.

According to yet another preferred embodiment of the invention, the sealing layer comprises, as a solid lubricant, graphite and/or boron nitride and/or molybdenum sulfide.

According to another embodiment, the sealing layer comprises, as pigment particles, white pigments, in particular TiO$_2$ rutiles, platelet-shaped and/or spherically, in place of the above-mentioned black pigments.

The white pigments preferably include TiO$_2$ rutiles, optionally upgraded with an SiO$_2$ or Al$_2$O$_3$ coating. By using these pigments, light-colored and white sealing layers may be produced. Preferred average particle sizes range from D50=0.1 to 20 μm, more preferably from D50=5 to 20 μm.

In a particularly preferred embodiment, the fraction of inorganic solid particles of the total weight of the sealing layer ranges from 10 to 70 wt. %, preferably from 20 to 50 wt. %, and more preferably from 30 to 40 wt. %, with the solid particles at least comprising the pigment particles. A certain amount of inorganic solid particles on the one hand advantageously permits to produce covering or opaque sealing layers already with small layer thicknesses, and on the other hand enhances the adhesion of the layer, in particular with respect to bondings.

Advantageously, by selecting appropriate pigments and solid lubricants, colorimetric loci may be produced which could previously only be approximated or could not be made to be sufficiently temperature stable. So according to a particularly preferred embodiment of the invention, sealing layers may be produced, which combined with the coloring layer in a layer composite have a very dark colorimetric locus, in particular the black color, which has an L* value ranging from 2 to 30, preferably from 2 to 25, and more preferably from 2 to 20, but also sealing layers which in the layer composite with the coloring layer have a very light-colored colorimetric locus, with L* values from 65 to 98, preferably from 70 to 98, and more preferably from 80 to 98, the colorimetric loci being measured through the glass or glass ceramic substrate. These colorimetric loci cannot be produced with the sealing systems currently known or not in adequate quality, since it is just with these color shades that slight color changes may occur, for example due to overheating, and that the sealing effect is limited for specific contact materials.

Of course, other pigments known in the art may be used as well to obtain any colorimetric loci. This however, under the presupposition that the use of these pigments does not lead to an insufficient adhesion or bonding strength of the sealing layer.

Another advantage of such silicone coatings is that for known decoration layers, in particular those based on sol-gel, thermally induced offsets of colorimetric loci can be mitigated to an extent to be no longer visible to the eye, or at least not conspicuously. This applies especially to offsets of colorimetric loci caused by momentary overheating events. Therefore, a decorative coating preferably has a temperature-stable Lab colorimetric locus that varies by not more than 1, i.e. ΔL<1, when the glass or glass ceramic article is exposed to temperatures of not more than 450° C. for not more than 5 minutes. Here, the change in color, i.e. the colorimetric loci before and after the change, are determined looking through the glass or glass ceramic substrate.

A glass and in particular a glass ceramic article as described above may advantageously be used as a cooktop, the decorative coating being applied in particular on the bottom surface of the cooktop. In this case, the sealing layer preferably covers at least the edge regions and/or at least the non-heated areas of the cooktop. But also the heating zones may advantageously be provided with a sealing layer. This is advantageously enabled due to the good bondability and heat resistance of the sealing layer.

DETAILED DESCRIPTION OF THE INVENTION

Figure 2:
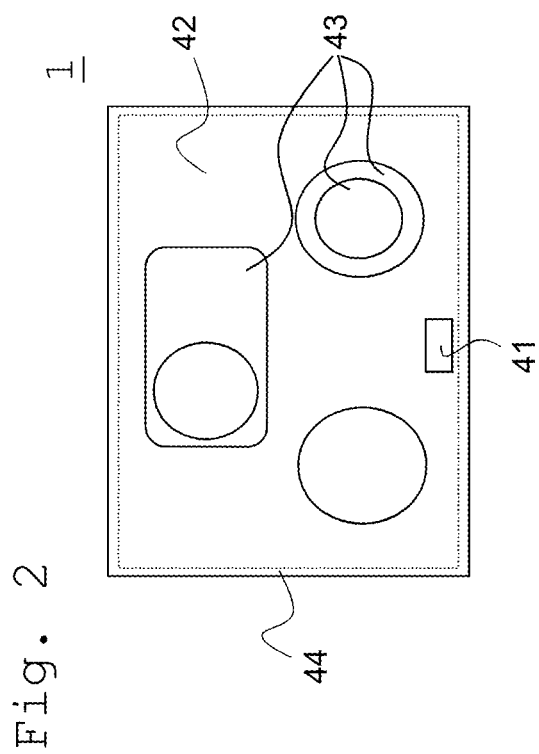

The invention will now be described in detail with reference to exemplary embodiments. The same reference numerals in different figures refer to the same or similar features.
In the Drawings:

FIG. 1 is a schematic cross section through a glass or ceramic article having a decorative coating; and FIG. 2 is a plan view of a cooktop comprising a glass or ceramic article having decorative coating.

FIG. 1 illustrates a schematic cross section through a glass or glass ceramic article 1 according to the invention. The glass or glass ceramic article 1 comprises a glass or glass ceramic substrate 2 having a decorative coating that comprises a decoration layer 10 and a sealing layer 20. Both the decoration layer 10 and the sealing layer 20 include inorganic solid particles. Substrates that may be used are glass substrates, for example of borosilicate glass, or glass ceramics such as lithium-aluminosilicate glass ceramics.

According to a particularly preferred embodiment of the invention, the decoration layer 10 comprises, as the inorganic solid particles, pigment particles 11, fillers 12, and a solid lubricant 13, which are embedded in a sol-gel matrix 15, a metal or semi-metal network. Moreover, decoration layer 10 has pores 14.

The sealing layer 20, in this embodiment, comprises pigment particles 21 and solid lubricant 23, which are embedded or incorporated in a silicone-based matrix 25. In contrast to decoration layer 10, sealing layer 20 exhibits virtually no porosity, which is an essential factor for its imperviousness to contact media.

According to a particularly preferred embodiment, for producing decoration layer 10, pigment particles 11 and/or fillers 12 and solid lubricant 13 are mixed with a sol, the mixture is applied as a layer onto substrate 2, preferably by screen printing, is dried at temperatures from 100° C. to 250° C., and baked at temperatures above 350° C.

Inorganic solid particles 11, 12, 13 are added to the sol of decoration layer 10 in a mass ratio of pigment particles 11 and/or fillers 12 to the solid lubricant 13 ranging from 10:1 to 1:1, preferably from 3:1 to 1:1, more preferably from 3:1 to 1.5:1. Pigment particles included may comprise non-platelet-shaped or platelet-shaped pigment particles.

Non-platelet-shaped pigment particles that are preferably used for dark colorimetric loci, granular and/or columnar and/or rod-shaped pigments such as (Cr, Fe)(Ni, Mn) spinels, and/or (Fe, Mn)$_2$O$_3$, and/or (Fe, Mn)(Fe, Mn)O$_4$, and/or CuCr$_2$O$_4$, and/or (Ni, Fe)(Cr, Fe)$_2$O$_4$. In order to produce colored colorimetric loci, it is also possible to use CoAl-, CoCrAl-, CoCrMgTiZnAl-, CoNiZnTi-, NiSbTi-, CrSbTi-, FeAlTi-based pigments. Pigments preferably used are easily dispersible pigments which are provided with a thin inorganic coating of typically less than 100 nm.

Platelet-shaped pigment particles that may be added, are for example effect pigments, such as mica or glass flakes. Well suited is platelet-shaped mica coated with, e.g., $SiO_2/TiO_2$ or $SiO_2/TiO_2/SnO_2$ or $SiO_2/TiO_2/Fe_2O_3$. Preferably, the platelet-shaped pigments have diameters of less than 200 μm, more preferably less than 100 μm, most preferably less than 60 μm.

A solid lubricant 13 that may be used for producing decoration layer 10, is graphite and/or alpha-boron nitride and/or molybdenum sulfide and/or a material whose surface energy exceeds the surface energy of graphite by not more than 20%.

In addition to pigment particles 11, decoration layer 10 may also include filler particles 12. It is also possible that only fillers 12 are included together with the solid lubricant 13, and no pigment particles 11.

Pigment particles 11 and/or filler particles 12, and solid lubricant 13 are bonded by a sol-gel binder 15 to form a solid layer, wherein the proportion by weight of inorganic solid particles 11, 12, 13 is preferably greater than the proportion by weight of the solidified and cured sol-gel binder. Preferably, in a decoration layer 10 as shown FIG. 1, the percentage fraction of sol-gel binder 15 is not more than 40 wt. %, or even not more than 30 wt. % of the total mass of decoration layer 10.

Due to the high solids content or the low proportion of sol-gel binder, pores 14 remain persistent. The generally micro- and/or mesoporous layer is relatively flexible, so allowing to compensate for differences in thermal expansion coefficients of substrate 2 and decoration layer 10. Microporous layers, according to IUPAC definition, are generally understood as layers whose average pore diameter is smaller than 2 nm. Mesoporous layers, according to IUPAC definition, have an average pore diameter from 2 to 50 nm.

A gel-type sol-gel binder may for example be produced as follows:

A mixture of tetraethoxyorthosilane (TEOS) and triethoxymethylsilane (TEMS) is prepared, and alcohol may be added as a solvent. An aqueous metal oxide dispersion, in particular a dispersion of $SiO_2$ in form of colloidally dispersed $SiO_2$ particles, is mixed with an acid, preferably hydrochloric acid or another mineral acid such as sulfuric acid. The two separately prepared mixtures may be stirred, for improved homogenization. Subsequently, the two mixtures are combined and mixed. Advantageously, this mixture may be allowed to mature, for example for one hour, preferably under constant stirring. In parallel to the preparation of this mixture, pigment particles 11 and/or fillers 12, and solid lubricant particles 13 may be weighed, added to the maturing mixture, and dispersed. As a filler, for example, fumed silica may be added. Fumed silica and/or the colloidal $SiO_2$ dispersion provide the spherical filler particles 12 for the final decoration layer 10.

Depending on the intended type of application to the substrate, different solvents, rheological additives, and other additives may be added to the mixture. In principle, decoration layer 10 may be applied to the glass or glass ceramic substrate 2 using any process known in the art.

The sol is transformed into a metal oxide xerogel network, by evaporation of the alcohol and by polycondenzation of the hydrolyzed TEOS and TEMS. This process is accelerated after application of the mixture onto substrate 2 by drying at temperatures from 100 to 250° C., so that the applied layer solidifies to form the xerogel. If, for example, TEOS and/or TEMS are used as starting materials, a $SiO_2$ network is formed, in particular an at least partially methyl- and ethoxy-substituted $SiO_2$ network. The subsequent baking of the dried layer at temperatures preferably above 350° C. completes the reaction into the $SiO_2$ network, resulting in a densification of the so produced decoration layer 10.

In the exemplary embodiment shown in FIG. 1, decoration layer 10 is partially covered by a sealing layer 20. This area is identified by reference numeral 31. Partly, however, sealing layer 20 directly contacts the glass or glass ceramic substrate 2, without any decoration layer 10 between sealing layer 20 the substrate 2. This area is identified by reference numeral 34.

According to a particularly preferred embodiment of the invention, a glass or glass ceramic article having a decorative coating comprises areas in which a decoration layer 10 and a sealing layer 20 are applied to substrate 2, see area 31, as well as areas in which only a sealing layer 20 is applied to substrate 2, see area 34, or only a decoration layer 10, see area 32. Besides coated areas, the glass or glass ceramic article may also comprise areas that have no decorative coating, see area 33.

Most preferably, the sealing layer of cooktop bottom surface coatings covers the cold areas of the cooktop and/or the edge regions of the cooktop. In these edge regions, the cooktop is adhesively bonded to the cooking hob, and this bonding should not be visible through the cooktop. For this reason, on the one hand the coating in this region must have an adhesion strength capable of withstanding the weight of the cooking hob. On the other hand, the bonding agent must not penetrate into the coating so that no discolorations become visible from above through the cooktop. Since the cured silicone coating including the pigment particles of sealing layer 20 surprisingly exhibits this necessary adhesion strength and also provides the imperviousness required, it preferably covers these edge regions.

Sealing layer 20 comprises a cured silicone coating including inorganic solid particles. Preferably, sealing layer 20 comprises a polysiloxane coating, more preferably a methyl-based polysiloxane coating, and most preferably a polydimethylsiloxane coating with inorganic solid particles.

According to another preferred embodiment of the invention, the sealing layer 20 may be a layer comprising polysilsesquioxane, wherein the organic radicals preferably include ethoxy and/or hydroxy groups. Of course, sealing layer 20 may likewise comprise a coating of a mixture of polysiloxane and polysilsesquioxane.

As is the case with decoration layer 10, the inorganic solid particles included may comprise pigment particles 21 and/or fillers and/or a solid lubricant 23. In the example illustrated in FIG. 1, sealing layer 20 comprises pigment particles 21 and solid lubricant 23.

Generally, sealing layer 20 may comprise, as pigment particles 21, black pigments, in particular spinels and/or effect pigments, especially platelet-shaped pigments. Black pigments that may preferably be used include (Cr, Fe)(Ni, Mn) spinel, and/or (Fe, Mn)$_2$O$_3$, and/or (Fe, Mn)(Fe, Mn)O$_4$. Basically, the platelet-shaped pigments and solid lubricants described above for decoration layer 10 may be used as the platelet-shaped pigments and solid lubricant 23.

More preferably, the proportion of inorganic solid particles in sealing layer 20, which comprises at least the pigment particles, ranges at least from 10 to 70 wt. %, preferably from 20 to 50 wt. %, and most preferably at least from 30 to 40 wt. % of the total weight of sealing layer 20.

A particular advantage of a silicone-based sealing layer as described above is that it enables to produce very light-colored and very dark colorimetric loci of high quality which previously could not been achieved in sufficient quality.

Therefore, according to a particularly preferred embodiment, the decorative coating has an L* value ranging from 2 to 30, preferably from 2 to 25, and more preferably from 2 to 20, or an L* value ranging from 65 to 98, preferably from 70 to 98, and more preferably from 80 to 98, wherein the colorimetric loci are measured through the glass or glass ceramic substrate.

According to another preferred embodiment of the invention, the color locus of such a decorative coating is stable, even during short-term overheating, which is an essential quality feature in particular for use as a cooktop. In particular in case of light-colored colorimetric loci, even slight color changes are visible to the spectator and thus distracting. A disadvantage of decorative sol-gel coatings in this context is that in case of overheating residual organic constituents burn but cannot escape. This often results in a brownish discoloration in the region of overheating.

Therefore, a decorative coating preferably has a temperature-stable Lab colorimetric locus that varies by not more than 1, i.e. $\Delta L < 1$, if the glass or glass ceramic article is exposed to temperatures of not more than 450° C. for not more than 5 minutes.

If silicone-based sealing layers are overheated, a silicification of such a coating may occur in the worst case. A silicification results in a slight lightening of the colorimetric locus, which however is not so obvious to the eye of a spectator.

In order to avoid a subsequent color change of the sealing layer 20, the sealing layer may be cured at temperatures above 250° C., and preferably even above 270° C. Preferably, curing is accomplished at temperatures from 250° C. to 330° C. At temperatures above 250° C., silicification of the sealing layer 20 starts. If complete silicification is achieved by curing, the colorimetric locus of the sealing layer will not change any more in later use, even not in events of momentary overheating.

According to a particularly preferred embodiment of the invention, sealing layer 20 may be composed as follows:
60-80 wt. % of polydimethylsiloxane;
10-40 wt. % of black pigments, in particular from the group comprising (Cr, Fe)(Ni, Mn) spinel, Cu(Cr, Fe, Mn)$_2$O$_4$ spinel (black 28), Co(Cr, Fe)$_2$O$_4$ (black 27), (Ni, Fe)(Cr, Fe)O$_4$ spinel (black 30), (Fe, Mn)$_2$O$_3$ (black 33), (Fe, Mn) (Fe, Mn)$_2$O$_4$ spinel (black 26), and (Cu, Cr) O$_x$(black 28);
5-15 wt. % of graphite having a D90 value from 5 to 20 μm (both synthetic and non-synthetic).

According to another preferred embodiment of the invention, sealing layer 20 may be composed as follows:
60-80 wt. % of polydimethylsiloxane;
10-30 wt. % of white pigment, in particular from the group of TiO$_2$ rutile;
5-10 wt. % of graphite having a D90 value from 5 to 20 μm (both synthetic and non-synthetic);
0-10 wt. % of platelet-shaped pigment, for example effect pigments with a mean diameter from 5 to 60 μm, e.g. coated and non-coated mica pigments and/or SiO$_2$— and Al$_2$O$_3$-based flakes with TiO$_2$ and Fe$_2$O$_3$ coatings.

According to another embodiment of the invention, a color synthesis comprising platelet-shaped pigments may have the following exemplary composition:
60-80 wt. % of polydimethylsiloxane;
10-30 wt. % of platelet-shaped pigment, for example effect pigments with a mean diameter from 5 to 60 μm, e.g. coated and non-coated mica pigments and/or SiO$_2$- and Al$_2$O$_3$-based flakes with TiO$_2$ and Fe$_2$O$_3$ coatings.

A silicone coating may, for example, be produced as follows: First, Silres MK powder is weighted and dissolved in butyl carbitol acetate. To this end, the Silres MK powder is introduced by stirring into the butyl carbitol acetate to which a defoamer has been added, using a wing-type or dissolver mixer, until it dissolves after about 60 minutes. In order to avoid any contamination by foreign matter such as by dust particles, the solution is passed through a fine sieve, for example a 140 mesh sieve.

The dissolution behavior of the Silres MK powder in the solvent and the homogeneity of the solution may be verified by spreading out the solution onto a glass sheet.

The silicone solution so produced and the pigment particles, and optionally solid lubricant are weighed according to the recipe. The respective fractions of pigment particles, and optionally solid lubricant are added to the silicone solution and dispersed. Final dispersion and homogenization is accomplished by repeated trituration in a 3-roll mill.

The coating solution thus obtained may then be applied onto the glass or glass ceramic substrate by a flat-bed screen printing method, and the substrate may be cleaned before (e.g. standard cleaning using washing machine or manual washing with isopropanol).

A 140 mesh sieve fabric has proven advantageous. Depending on the requirements, this may also be varied.

The thus applied coating is then cured or dried at temperatures between 200 and 330° C. More preferably, the curing temperature is at least 270° C. The baking time preferably ranges from 30 to 60 minutes. If drying is carried out at temperatures below 200° C., possibly the adhesive strengths required for use as a cooktop bottom surface coating cannot be achieved. However, this does not preclude that drying below 200° C. may be useful if the glass or glass ceramic article having the decorative coating is not to be used for cooktops bottom surface coatings, or if at least in the places where sealing layer 20 is applied there is no bonding to be effected.

FIG. 2 shows a plan view of a glass or glass ceramic article 1 having a decorative coating, the article being designed as a cooktop. The cooktop comprises a glass ceramic substrate 2 with a decorative coating comprised of a decoration layer 10 and a sealing layer 20. Neither decoration layer 10 nor sealing layer 20 need to be applied over the entire surface. Rather, both layers 10, 20 may cover only portions of substrate 2.

Decoration layer 10 is applied on the entire glass ceramic substrate 2, with the exception of a sensor field 41. The sensor field 41 is left blank and may selectively remain unprinted, for an LC display, or may optionally be provided with a semi-transparent layer, e.g. for a 7-segment displays.

Sealing layer 20 may cover both the "cold" areas 42 and additionally the cooking zones or cooking hobs 43 of the glass ceramic article 1, and is especially provided in the edge regions 44 in which bonding with the cooking hob is effected.

Hobs 43 may exclusively be provided with a decoration layer 10, or with a combination of decoration layer 10 and sealing layer 20. Of course it is possible to use different recipes for the decorative coating of a glass or glass ceramic substrate, for example in case the cooktop is intended to have areas of different appearance and/or color.

In specific areas, hobs 43 may only be provided with sealing layer 20, for example in order to form decorative elements (such as thin lines, etc.).

The cooktop coating is preferably applied to the bottom surface of the glass ceramic substrate, it therefore faces the substructure of the cooker.

Moreover, for a decorative coating according to claim 1 there is no need to use a decoration layer according to the composition described above. Generally any sol-gel coating that includes inorganic solid particles suitable for the respective application can be used.

It will be apparent to those skilled in the art that the invention is not limited to the exemplary embodiments described above but may rather be varied in many ways. In particular, the features of the individual exemplary embodiments may be combined.

LIST OF REFERENCE NUMERALS 1 glass or glass ceramic article
2 glass or glass ceramic substrate
10 decoration layer
11 pigment particles
12 fillers
13 solid lubricant
14 pores
15 sol-gel matrix, semi-metal or metal oxide network
20 sealing layer
21 pigment particles
23 solid lubricant
25 silicone-based matrix
31 area with decoration and sealing layers
32 area with decoration layer
33 area without decoration layer
34 area with sealing layer
41 sensor field
42 non-heated, "cold" areas of cooktop
43 heating zones
44 edge region of cooktop

The invention claimed is:

1. A glass or glass ceramic article comprising:
a glass or glass ceramic substrate;
a decoration layer applied to at least some surface portions of the glass or glass ceramic substrate, the decoration layer is a cured sol-gel coating including first inorganic solid particles; and
a sealing layer is applied to at least portions of the decoration layer and to at least some surface portions of the glass or glass ceramic substrate without the decoration layer, the sealing layer is a cured silicone-based coating including second inorganic solid particles, the second inorganic solid particles comprising pigment particles, and the second inorganic solid particles being present in the sealing layer in a proportion that ranges from 10 to 70 wt. % of total weight of the sealing layer,
wherein the sealing layer comprises a coating selected from the group consisting of polysiloxane coating, a polysilsesquioxane coating, and any mixtures thereof.

2. The article as claimed in claim 1, wherein the proportion ranges from 20 to 50 wt. % of total weight of the sealing layer.

3. The article as claimed in claim 1, wherein the proportion ranges from 30 to 40 wt. % of total weight of the sealing layer.

4. The article as claimed in claim 1, wherein the first inorganic solid particles comprise pigment particles, fillers, and any combinations thereof.

5. A glass or glass ceramic article comprising:
a glass or glass ceramic substrate;
a decoration layer applied to at least some surface portions of the glass or glass ceramic substrate, the decoration layer is a cured sol-gel coating including first inorganic solid particles; and
a sealing layer is applied to at least portions of the decoration layer and to at least some surface portions of the glass or glass ceramic substrate without the decoration layer, the sealing layer is a cured silicone-based coating including second inorganic solid particles, the second inorganic solid particles comprising pigment particles, and the second inorganic solid particles being present in the sealing layer in a proportion that ranges from 10 to 70 wt. % of total weight of the sealing layer,
wherein the first inorganic solid particles comprise pigment particles, fillers, and any combinations thereof, and
wherein the decoration layer further comprises solid lubricant.

6. A glass or glass ceramic article comprising:
a glass or glass ceramic substrate;
a decoration layer applied to at least some surface portions of the glass or glass ceramic substrate, the decoration layer is a cured sol-gel coating including first inorganic solid particles; and
a sealing layer is applied to at least portions of the decoration layer and to at least some surface portions of the glass or glass ceramic substrate without the decoration layer, the sealing layer is a cured silicone-based coating including second inorganic solid particles, the second inorganic solid particles comprising pigment particles, and the second inorganic solid particles being present in the sealing layer in a proportion that ranges from 10 to 70 wt. % of total weight of the sealing layer, wherein the sealing layer further comprises solid lubricant.

7. The article as claimed in claim 1, wherein the decoration layer comprises, as a cured sol-gel binder, a metal oxide network.

8. The article as claimed in claim 7, wherein the metal oxide network is a $SiO_2$ network.

9. The article as claimed in claim 7, wherein the decoration layer further comprises solid lubricant and a material selected from the group consisting of pigment particles, fillers, and combinations thereof, the material being present in a ratio to the solid lubricant in a range from 10:1 to 1:1, in weight percentages.

10. The article as claimed in claim 1, wherein the decoration layer further comprise a solid lubricant selected from the group consisting of graphite, alpha-boron nitride, molybdenum sulfide, and any combinations thereof.

11. The article as claimed in claim 1, wherein the polysiloxane coating comprises a methyl-based polysiloxane coating or a polydimethylsiloxane coating.

12. The article as claimed in claim 1, wherein the polysilsesquioxane coating comprises organic radicals selected from the group consisting of ethoxy, hydroxy groups, and combinations thereof.

13. The article as claimed in claim 1, wherein the sealing layer comprises, as the pigment particles, particles selected from the group consisting of black pigments, spinels, effect pigments, and platelet-shaped pigments.

14. The article as claimed in claim 13, wherein the sealing layer further comprises a solid lubricant.

15. The article as claimed in claim 1, wherein the decoration layer has an L* value from 2 to 30 as measured through the glass or glass ceramic substrate.

16. The article as claimed in claim 1, wherein the decoration layer has an L* value from 65 to 98 as measured through the glass or glass ceramic substrate.

17. The article as claimed in claim 1, wherein the decoration layer has a temperature-stable Lab colorimetric locus that varies by not more than 1 when exposed to temperatures of not more than 450° C. for not more than 5 minutes, the colorimetric loci being measured through the glass or glass ceramic substrate.

18. A method for producing a glass or glass ceramic article, comprising:
mixing inorganic solid particles and a sol to form a decoration mixture;

applying the decoration mixture to at least some surface portions of a glass or glass ceramic substrate;
curing the decoration mixture to form a decoration layer;
mixing solid particles and a silicone-based coating solution to form a sealing mixture;
applying the sealing mixture to the glass or glass ceramic substrate coated with the decoration layer; and
curing the sealing mixture to form a sealing layer, wherein the sealing layer comprises a coating selected from the group consisting of a polysiloxane coating, a polysilsesquioxane coating, and a mixture thereof.

19. The method as claimed in claim 18, wherein the inorganic solid particles comprise particles selected from the group consisting of pigment particles, fillers, and combinations thereof.

20. A method for producing a glass or glass ceramic article, comprising:
mixing inorganic solid particles and a sol to form a decoration mixture;
applying the decoration mixture to at least some surface portions of a glass or glass ceramic substrate;
curing the decoration mixture to form a decoration layer;
mixing solid particles and a silicone-based coating solution to form a sealing mixture;
applying the sealing mixture to the glass or glass ceramic substrate coated with the decoration layer; and
curing the sealing mixture to form a sealing layer,
wherein the inorganic solid particles comprise particles selected from the group consisting of pigment particles, fillers, and combinations thereof, and
wherein the decoration mixture further comprises solid lubricant.

21. The method as claimed in claim 20, wherein the particles have a ratio of weight percentage to solid lubricant ranging from 10:1 to 1:1.

22. The method as claimed in claim 18, wherein the solid particles comprise particles selected from the group consisting of black pigments, spinels, effect pigments, platelet-like pigments.

23. A method for producing a glass or glass ceramic article, comprising:
mixing inorganic solid particles and a sol to form a decoration mixture;
applying the decoration mixture to at least some surface portions of a glass or glass ceramic substrate;
curing the decoration mixture to form a decoration layer;
mixing solid particles and a silicone-based coating solution to form a sealing mixture;
applying the sealing mixture to the glass or glass ceramic substrate coated with the decoration layer; and
curing the sealing mixture to form a sealing layer,
wherein the solid particles comprise particles selected from the group consisting of black pigments, spinels, effect pigments, platelet-like pigments, and
wherein the sealing layer further comprises a solid lubricant.

24. The method as claimed in claim 18, wherein the step of curing the sealing mixture to form the sealing layer comprises drying at temperatures above 200° C.

* * * * *